Patented Jan. 18, 1927.

1,614,707

UNITED STATES PATENT OFFICE.

OSCAR L. BARNEBEY, OF COLUMBUS, AND MERRITT B. CHENEY, DECEASED, LATE OF BRIGGSDALE, OHIO; BY JOSEPHINE B. CHENEY, ADMINISTRATRIX, OF BRIGGSDALE, OHIO.

PROCESS OF MAKING ADSORBENT CARBON.

No Drawing.   Application filed February 14, 1925.   Serial No. 9,323.

This application is a continuation in part of our application Ser. No. 283,639, filed March 19, 1919 on process for the manufacture of activated material, which has issued into U. S. Patent No. 1,541,099.

This invention relates to the manufacture of carbon having high adsorption power for gases and vapors, and more specifically to a process of activating carbonaceous material by means of steam.

Among the objects of this invention is the provision of a method for activating carbon whereby the carbon or carbonaceous material is treated with steam under conditions to yield carbon having high gas and vapor adsorption capacity. A further object of this invention consists in the carrying out of the activation process in a manner that will result in a minimum loss of the material undergoing activation.

In order to render carbon highly adsorbent in its behavior toward gases and vapors it must be treated so as to give the carbon the maximum available surface area for exposure to the action of gases or vapors. To bring about this effect, the carbon is caused to react with a gas in such a manner as to remove a portion of the carbon or carbonaceous material therein and leave pores, spaces or ducts in the residual material to impart thereto the adsorption properties.

Heretofore, this activation has been carried out by heating the carbon and activating gas to as high a temperature as possible, practically the only temperature limitations being the life of the materials of furnace construction. At these high temperatures the reactive gas burns away the material from the outer surfaces of the carbon before the gas has time to penetrate into the interior of the particle for reaction and activation. This operation has resulted in an inferior quality of product accompanied by a high loss of material. These processes operating at these high temperatures with steam as the activating gas make use of the so-called "water-gas reaction", namely the reaction between carbon and water that forms water-gas, which is a mixture of carbon monoxide and hydrogen in equi-molecular proportions. The reaction taking place is a follows:

In this invention, the water-gas reaction is dispensed with as far as possible, if not entirely. We have discovered that the reaction most favorable to the production of activated carbon with steam as the activating gas is that which produces carbon dioxide and hydrogen, according to the following equation:

This reaction is brought about at relatively low temperatures, namely temperatures below 900° C., and if this reaction only is to occur without any material formation of CO, the temperature should not greatly exceed 800° C. Temperatures of 700–900° C. are preferred because the reaction ordinarily becomes too slow for satisfactory practice when temperatures below 700° C. are employed. In some cases, especially with loosely textured materials, temperatures below 700° C. may be used. However, even in these cases the use of the lower temperatures renders the operation quite slow.

In practicing this invention, the production of a small amount of carbon monoxide is not an extremely serious factor, but the major portion of the reaction must occur to produce by the reaction carbon dioxide and not carbon monoxide. For producing the highest adsorption qualities in the carbonaceous material, we prefer to have the reaction between the carbon and steam to take place so as to yield gaseous reaction products having at least 30% $CO_2$ and not more than 5% CO. Good results are obtained when the $CO_2$ content in the gaseous reaction prducts of the steam and carbon is as low as 25%, but in order to obtain satisfactory results the quantity of $CO_2$ in this gaseous reaction product should not fall below 20% nor should the quantity of CO formed exceed 20%. These percentages are based upon the actual reaction products themselves and are independent of the water content which is in excess and is not consumed in the reaction.

In carrying out our improved process, use is made of any suitable furnace in which the carbonaceous material to be treated can be brought in effective contact with the treating gases while being heated.

The treating gases may be steam or gases containing steam. For example, combustion gases containing $H_2O$ as a primary oxidation product may be employed as the reactive gas in our process by carrying out the reaction at sufficiently low temperatures to yield the reaction products mentioned above. If the temperature in these cases is too high, the efficiency will be reduced. If combustion gases are employed, the nitrogen therein dilutes the reactive gases and slows down the reaction but in some cases this effect is advantageous.

When gases contain $H_2O$ along with a diluent gas, such as nitrogen or carbon dioxide originally present in the gaseous mixture, and such are used for reaction, the reaction is best caused to take place in such a manner as to have 90% of the reaction occurring to produce carbon dioxide and hydrogen and to produce not more than 10% water gas. For even the lower activities of material it is preferable to cause over 60% of the reaction to produce carbon dioxide and hydrogen and still better over 80% of the reaction to occur producing carbon dioxide and hydrogen, in which cases the maximum volume of water gas shall not be more than 40% and 20% respectively of the total reaction products, calculated independently of the volumes of diluent gas or gases present.

In practicing this invention, regardless of the nature or source of the gas employed for the reaction, the temperature is so regulated, that is below 900° C., to give a slow reaction, thus imparting the maximum gas adsorptive values to the carbon with a minimum loss of material. All gases used for reaction purposes must be of such a nature as to react with the carbonaceous material endothermically since we have found that exothermic reactions tend to produce rapid accumulation of heat within the granules or pieces of carbon, resulting in burning away carbon which has previously been rendered adsorptive and giving a low-grade product as well as very low yield of finished material. By using an endothermic reaction and as low a temperature as possible, although the time of reaction is prolonged, the process will yield a carbon of maximum adsorbent value without undue loss of carbonaceous material.

When the material has been subjected to the oxidizing heat treatment for a time sufficient to give it the desired qualities, such time varying with the temperature and concentration of the treating gases, said material is cooled and discharged from the furnace.

In carrying out this process, it is preferable to have the carbon undergoing activation arranged in thin layers or masses, as described in our aforesaid U. S. Patent No. 1,541,099. By having the activating gas in intimate contact with the material being treated, a low temperature reaction may be accomplished in a short space of time. An apparatus suitable for carrying out this process is disclosed in the aforesaid U. S. Patent No. 1,541,099. It is also preferable to maintain the layers of carbon in a substantially quiescent state so that there will be substantially no intermotion of the granules or pieces of carbon in the layer.

It is to be understood, however, that the invention is not limited to these last described conditions, since the advantages of the invention can be realized in a large measure without maintaining these specific conditions.

A specific example of our improved process is as follows:

Uniform ¾″ layers of charcoal derived from cocoanuts are charged into a furnace as described in U. S. Patent No. 1,541,099 to Oscar L. Barnebey and Merritt B. Cheney. The reactive gas in the furnace consists of an atmosphere of 50% combustion gases and 50% steam by volume. The charcoal is gradually heated up to a temperature of 800° C. The time of treatment at substantially this temperature is from 5 to 7 hours. After this treatment the material is cooled and discharged from furnace. The charcoal is thus activated to possess a high adsorption value.

The expression granular is used to define the character of the material treated and is meant to include pieces of material whole or subdivided. If the whole piece, parts or grains of material are loose in texture they can be treated without any or with little subdivision. The physical state should be such that a considerable amount of space remains between the pieces, grains or particles available for gas circulation, such positioning allowing the activating gas to move with a certain amount of freedom thru the layer masses. The material should be small enough to permit the activating gases to penetrate uniformly but not fine enough to pack together densely and thus prevent penetration. The depth of layers of the material is regulated according to the size, shape and porosity of the material in order to insure penetration.

By the expression "carbon activating temperatures", as used in the appended claims, we mean temperatures at which steam reacts with carbon, namely temperatures upwards of 600° C.

If the carbon activation process is carried out in a long furnace, where the material is introduced at one end and withdrawn at the other, the material after activation may be cooled by introducing water in gaseous form at or near the exit end of the furnace. This water in gaseous form may be superheated, dry or saturated steam, water in atomized condition or mixtures of these, with or without association with other gases. The water in gaseous form after performing its function of cooling the activated carbon may then be drawn or passed into the carbon activation zone of the furnace and utilized for activation of other carbonaceous material.

The carbonaceous material employed for this purpose may be either natural, prepared or by-product carbon, or carbonaceous material containing partially formed carbon. Although we prefer to use carbon derived from vegetable carbons, mineral carbon can also be used. Preferred forms of crude carbon suitable for this invention are charcoals derived by carbonization of cocoanut shell, shells from cohune nuts and other similar dense vegetable materials.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. In a process of making adsorbent carbon, heating at carbon activating temperatures carbonaceous material and steam and generating therefrom gaseous reaction products of higher $CO_2$ content than CO content.

2. In a process of making adsorbent carbon, heating at carbon activating temperatures carbonaceous material and steam and generating therefrom gaseous reaction products containing a $CO_2$ content at least four times the CO content.

3. In a process of making adsorbent carbon, heating at carbon activation temperatures and below the temperature required for the "water-gas reaction" carbonaceous material with steam and generating therefrom gaseous reaction products having a $CO_2$ content at least four times the CO content.

4. In a process of making adsorbent carbon, heating carbonaceous material and steam at 700–900° C and generating therefrom gaseous reaction products having a $CO_2$ content at least four times the CO content.

5. In a process of making adsorbent carbon, heating at carbon activation temperatures carbonaceous material and steam, effecting an endothermic reaction between the carbonaceous material and steam and generating therefrom gaseous reaction products having a $CO_2$ content at least four times the CO content.

6. In a process of making adsorbent carbon, heating at carbon activating temperatures carbonaceous material and steam and generating therefrom gaseous reaction products of upwards of 20% $CO_2$ content.

7. In a process of making adsorbent carbon, heating at carbon activating temperatures carbonaceous material and steam and generating therefrom gaseous reaction products of less than 5% CO content.

8. In a process of making adsorbent carbon, heating at carbon activating temperatures carbonaceous material and steam and generating therefrom gaseous reaction products of upwards of 20% $CO_2$ content and of less than 5% CO content.

9. In a process of making adsorbent carbon, heating at 700–900° C. carbonaceous material and steam and generating therefrom gaseous reaction products having a $CO_2$ content of upwards of 20%.

10. In a process of making adsorbent carbon, heating at 700–900° C. carbonaceous material and steam and generating therefrom gaseous reaction products having a $CO_2$ content of at least 25%.

11. In a process of making adsorbent carbon, heating at 700–800° C. carbonaceous material and steam and generating therefrom gaseous reaction products having a $CO_2$ content of at least 30%.

12. In a process of making adsorbent carbon, heating at carbon activation temperatures and below the temperature required for the "water-gas reaction" a thin layer of carbonaceous material with steam and generating therefrom gaseous reaction products having a $CO_2$ content at least four times the CO content.

13. In a process of making adsorbent carbon, heating at carbon activation temperatures a thin layer of carbonaceous material and steam, effecting an endothermic reaction between the carbonaceous material and steam and generating therefrom gaseous reaction products of at least 20% $CO_2$ content and of less than CO content.

14. In a process of making adsorbent carbon, heating at 700–900° C. a thin layer of carbonaceous material and steam and generating therefrom gaseous reaction products having a $CO_2$ content of upwards of 20%.

OSCAR L. BARNEBEY.
JOSEPHINE B. CHENEY,
*Administratrix of the Estate of Merritt B Cheney, deceased.*